(12) United States Patent
Bell et al.

(10) Patent No.: US 9,361,946 B2
(45) Date of Patent: Jun. 7, 2016

(54) HANGING CARRIER FOR HDD

(71) Applicant: HGST Netherlands B.V., Amsterdam (NL)

(72) Inventors: Michael Stephen Bell, Colorado Springs, CO (US); Jeffrey David Wilke, Palmer Lake, CO (US)

(73) Assignee: HGST Netherlands B.V., Amsterdam (NL)

( * ) Notice: Subject to any disclaimer, the term of this patent is extended or adjusted under 35 U.S.C. 154(b) by 13 days.

(21) Appl. No.: 14/316,781

(22) Filed: Jun. 26, 2014

(65) Prior Publication Data

US 2015/0380059 A1 Dec. 31, 2015

(51) Int. Cl.
*G11B 33/08* (2006.01)

(52) U.S. Cl.
CPC ................................. *G11B 33/08* (2013.01)

(58) Field of Classification Search
CPC .... G11B 33/08; G11B 33/121; G11B 33/125; G06F 1/181; G06F 1/184; G06F 1/187; G06F 1/161
USPC ............. 361/679.33, 679.34, 679.37, 679.39, 361/724–728, 730, 685, 686; 360/97.01; 312/223.1–223.3
See application file for complete search history.

(56) References Cited

U.S. PATENT DOCUMENTS

| | | | |
|---|---|---|---|
| 2,272,807 A | 2/1942 | Kronheim | |
| 4,841,100 A | 6/1989 | Ignasiak | |
| 5,761,031 A | 6/1998 | Ajmani | |
| 5,995,365 A | 11/1999 | Broder et al. | |
| 6,233,143 B1 | 5/2001 | Gamble et al. | |
| 6,249,432 B1 | 6/2001 | Gamble et al. | |
| 6,501,644 B1 | 12/2002 | Silverman et al. | |
| 6,592,387 B2 | 7/2003 | Komenda et al. | |
| 6,987,674 B2 | 1/2006 | El-Batal et al. | |
| 7,036,783 B2 * | 5/2006 | Chen .................... | G11B 33/128 248/222.11 |
| 7,492,585 B2 * | 2/2009 | Zhang .................... | G06F 1/187 312/334.7 |
| 7,515,407 B2 | 4/2009 | Goodman et al. | |
| 7,679,896 B2 * | 3/2010 | Deng ...................... | G06F 1/187 312/223.1 |
| 8,077,578 B2 * | 12/2011 | Tsuchida ............... | G11B 33/08 369/69 |
| 8,325,474 B2 | 12/2012 | Spaulding et al. | |
| 8,469,466 B2 * | 6/2013 | Gong ...................... | G06F 1/187 312/222 |
| 8,749,966 B1 * | 6/2014 | Boudreau ............... | G06F 1/187 361/679.33 |
| 8,931,748 B2 | 1/2015 | Bowman et al. | |
| 2005/0013108 A1 * | 1/2005 | Lee ......................... | G06F 1/184 361/679.36 |
| 2005/0088778 A1 * | 4/2005 | Chen ....................... | G06F 1/184 360/97.19 |

(Continued)

OTHER PUBLICATIONS

Compaq, "Compaq Hot Plug Drive Carrier Enhancements", Compaq Technology Brief, Document No. 0225-0699-A, Aug. 1999, 6 pages.

(Continued)

*Primary Examiner* — Hoa C Nguyen
*Assistant Examiner* — Sagar Shrestha

(57) ABSTRACT

A vibration isolating hard disk drive carrier for isolating the transfer of vibration from one hard disk drive to another comprising a carrier body and one or more isolation hangers is disclosed. The carrier has a first surface configured to couple to inherent features of a first external surface of a hard disk drive, and a second surface configured to couple to inherent features of a second external surface hard disk drive. One or more isolation hangers configured to support the hard disk drive in a vertical orientation are coupled to the carrier body.

18 Claims, 10 Drawing Sheets

(56) References Cited

U.S. PATENT DOCUMENTS

| | | | |
|---|---|---|---|
| 2005/0214098 A1* | 9/2005 | Franke | F16F 1/3732 411/401 |
| 2006/0130083 A1* | 6/2006 | Cheng | G11B 33/08 720/651 |
| 2007/0014085 A1* | 1/2007 | Meserth | G06F 1/184 361/679.35 |
| 2007/0085419 A1* | 4/2007 | Matsuo | G01C 21/265 307/10.1 |
| 2007/0153040 A1* | 7/2007 | Park | B41J 29/02 347/14 |
| 2008/0104280 A1 | 5/2008 | Biskeborn | |
| 2008/0165490 A1* | 7/2008 | Buckland | G11B 33/128 361/679.33 |
| 2009/0273896 A1* | 11/2009 | Walker | G06F 1/187 361/679.33 |
| 2010/0020438 A1 | 1/2010 | Gross et al. | |
| 2011/0001409 A1* | 1/2011 | Peng | G06F 1/187 312/301 |
| 2011/0109990 A1* | 5/2011 | Fang | G11B 33/08 360/98.08 |
| 2012/0069514 A1* | 3/2012 | Ross | G06F 1/20 361/679.33 |
| 2012/0327595 A1* | 12/2012 | Caldwell | G11B 33/08 361/679.59 |
| 2013/0199295 A1 | 8/2013 | Hoefer et al. | |
| 2014/0016262 A1* | 1/2014 | Lo | G06F 1/187 361/679.33 |

OTHER PUBLICATIONS

Aearo Technologies, "Data Storage Rotational Vibration Solution", Retrieved at: http://www.earsc.com/applications.asp?id=9&child-id=29&parentid=28 on Oct. 30, 2013, 1 page.

* cited by examiner

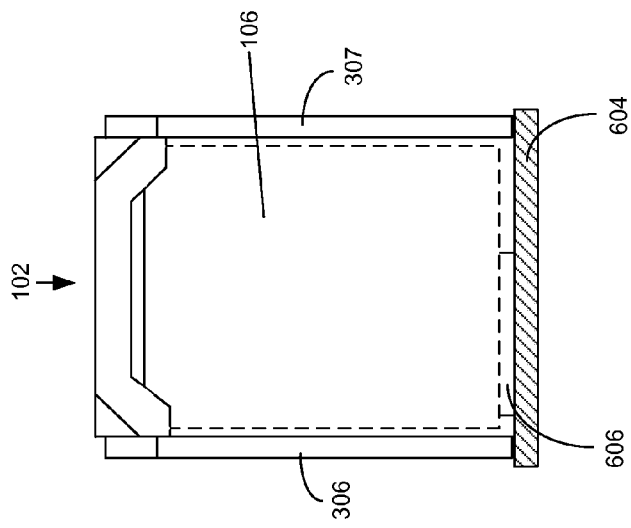
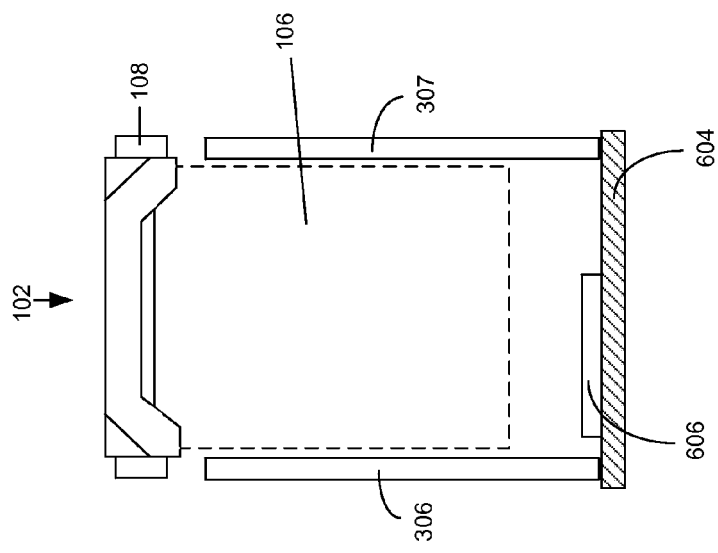
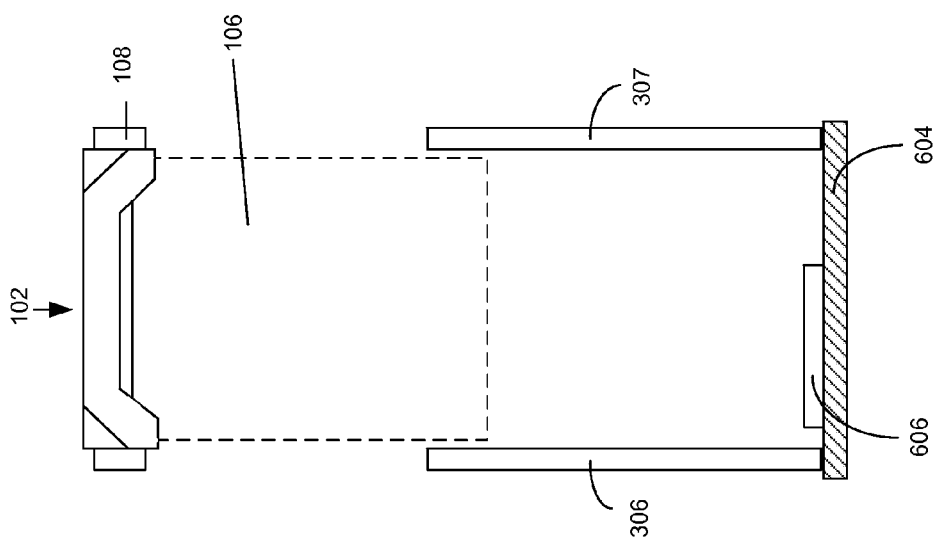

HANGING CARRIER FOR HDD

TECHNICAL BACKGROUND

As computer systems and networks grow in numbers and capability, there is a need for more and more storage system capacity. Cloud computing and large-scale data processing further increase the need for digital data storage systems that are capable of transferring and holding immense amounts of data.

One approach to providing sufficient data storage is the use of arrays of independent hard disk drives. A number of hard disk drives can be held in a container, sometimes referred to as a sled. The hard disk drives are held and operated in close proximity within the sled, so that many hard disk drives can be fit into a defined volume. Rackmount enclosures typically hold multiple sleds. Rackmount enclosures can be used to hold very large amounts of data.

Hard disk drives include spinning disks that are typically rotated at high speeds, such as a speed of 7,200 RPM, for example. A read head is moved inward or outward from the center of the spinning disks in order to read and write data on the disk. These moving components can generate vibrations in the hard disk drive. Hard disk drives include traditional hard disk drives and hybrid drives (combination of traditional rotating storage and solid state storage).

When a number of hard disk drives are included within a sled, the vibrations generated by one hard disk drive can be transferred to other hard disk drives within the sled. The transferred vibrations can interfere with operations of the affected hard disk drive or hard disk drives. The transferred vibrations can cause decreased performance or possible damage to components of the hard disk drive.

OVERVIEW

A vibration isolating hard disk drive carrier for isolating the transfer of vibration from one hard disk drive to another comprising a carrier body and one or more isolation hangers is disclosed. The carrier has a first surface configured to couple to inherent features of a first external surface of a hard disk drive, and a second surface configured to couple to inherent features of a second external surface hard disk drive. One or more isolation hangers configured to support the hard disk drive in a vertical orientation are coupled to the carrier body.

BRIEF DESCRIPTION OF THE DRAWINGS

FIGS. 7A, 7B, and 7C each illustrate the installation of a hard disk drive to a printed circuit board backplane.

DETAILED DESCRIPTION

Figure 1:
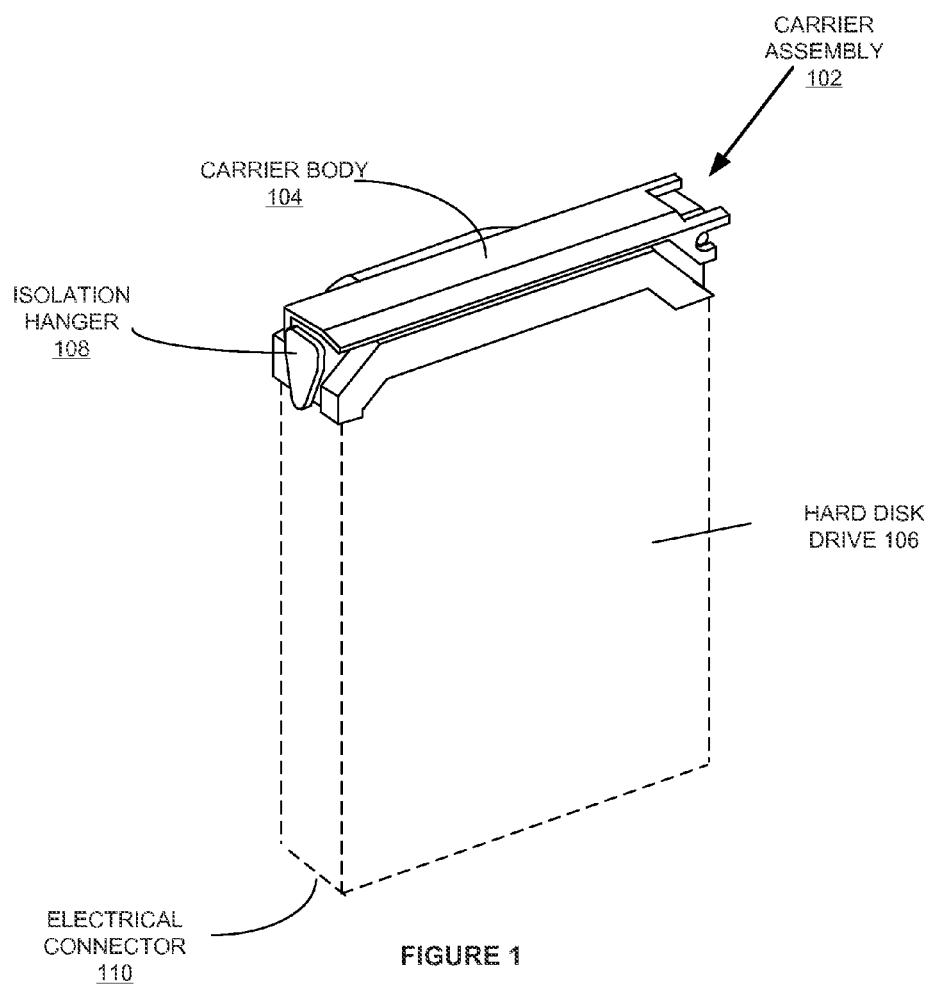
FIG. 1 illustrates a carrier assembly in relation to a hard disk drive.

FIG. 1 illustrates carrier assembly 102 for hard disk drive 106. Carrier assembly 102 comprises carrier body 104 and isolation hanger 108. Hard disk drive 106 and electrical connector are used as a reference to show how carrier assembly 102 functions. Carrier assembly 102 couples to hard disk drive 106. The shape of carrier body 104 may vary depending upon the type of hard disk drive 106 carrier assembly 102 is configured to secure. In one example, carrier assembly 102 may secure hard disk drive 106 by mating with features inherent to the external surfaces of hard disk drive 106. The external surfaces of hard disk drive 106 are not typically smooth. The inherent features discussed herein comprise variations in surface height, recesses, indentations, cavities, impressions, bulges, protrusions, or screw holes among other features. Carrier body 104 when configured to secure hard disk drive 106 by mating with features inherent to the external surfaces of hard disk drive 106 can negate the need for mechanical fasteners (e.g., screws) to secure hard disk drive 106 and thereby negate the need for tools to secure carrier assembly 102 to hard disk drive 106. In another example, carrier assembly 102 may comprise two parts attached by a hinge that open and close in a clamshell fashion encapsulating hard disk drive 106. In another example, carrier body 104 may comprise two independent halves that snap together via interlocking features.

Another inherent feature found on hard disk drive 106 are screw holes. Screw holes are included as part of hard disk drive 106 for traditional mounting. Screw holes are robust and predictable inherent features of hard disk drive 106 because they are often defined by a form factor standard. Fasteners (e.g., screws, bolts) may be used to couple the carrier body 104 to hard disk drive 106 using the inherent screw holes. Alternatively, a plastic dowel may be used to couple hard disk drive 106 to carrier body 104 by press-fitting the dowel into the inherent screw holes. Hard disk drive 106 can be secured by only two screw holes allowing hard disk drive 106 freedom of motion about the axis of the screws.

Carrier body 104 may be made by injection molding. Thermoplastics suitable for injection molding comprise acrylonitrile-butadiene-atyrene, acrylic, nylon, polycarbonate, polypropylene, polybenzimidazole, polyethylene, polystyrene, polyvinyl chloride or some other thermoplastic—including combinations thereof. Thermosetting polymers suitable for injection molding comprise polyurethane, phenol-formaldehyde resin, polyimides, polyester resins and some other thermosetting polymer—including combinations thereof.

Carrier body 104 may be made by machining operations. Materials suitable for machining operations comprise acetal copolymer, Delrin®, nylon, polycarbonate, polysuflone, Ultem®, aluminum, steel alloys and other materials—including combinations thereof.

Carrier assembly 102 comprises one or more isolation hangers 108. Isolation hanger 108 isolates hard disk drive 106 from vibration and orients hard disk drive 106 vertically in space against the force of gravity. Hard disk drive 106 has a plane substantially parallel to spinning disk platters contained within. Additionally, hard disk drive 106 has electrical connector 110 at one end in this example. In this context, when hard disk drive 106 is said to be hung vertically, the plane substantially parallel to the spinning disk platters is vertical, or perpendicular to the plane of the horizon. On many, but not all hard disk drive 106 examples, electrical connector 110 will face downward when in a vertical orientation.

Isolation hanger 108 is made from the similar or different materials than carrier body 104. Isolation hanger 108 may be made from a variety of different materials and manufacturing techniques. Material selection depends on what best isolates vibration for the intended example. One material may isolate certain frequencies better than others depending upon the specific application. Some examples of materials suitable for making isolation hanger 108 comprise rubber, polymers, polytetrafluoroethyle, polyurethane, polypropylene/butyl rubber blends, polyvinylchloride/chlorinated polyethylene/ epoxidized natural rubber blends, polyimide blends, polysulfone blends, nylon-6/polypropylene blends, elastomers and other vibration isolating materials—including combinations thereof.

Figure 2:
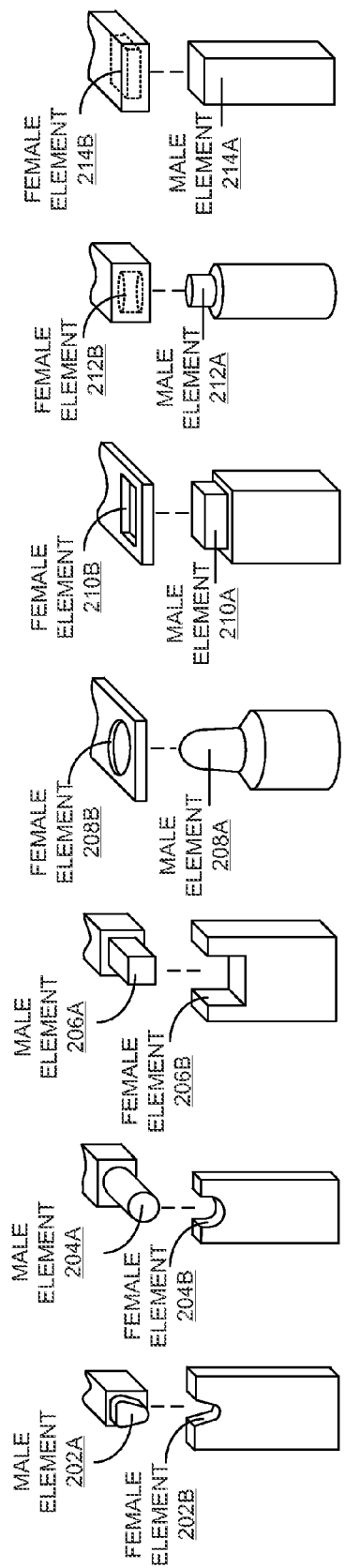
FIG. 2 illustrates various examples of isolation hanger geometries.

FIG. 2 illustrates some geometrical variations of possible configurations of isolation hanger 108. Isolation hanger 108 comprises a male element 202A or a female element 208B, for example. Isolation hanger 108 works in conjunction with drive divider 306, 307 of FIG. 3. In other examples, isolation hanger 108 comprises the male element and drive dividers 306,307 comprise the female element. This configuration is exemplified in FIG. 2, wherein isolation hanger 108 comprises male element 202A and drive dividers 306,307 comprise female element 202B. In another example, isolation hanger 108 comprises the female element and drive dividers 306,307 comprise the corresponding male element. This configuration is exemplified in FIG. 2 wherein isolation hanger 108 comprises female element 208B and drive dividers 306, 307 comprise male element 208A. It does not matter which male element or female element is coupled with isolation hanger 108 or drive dividers 306,307. In the first example discussed above, isolation hanger 108 comprises male element 202A and drive dividers 306,307 comprise female element 202B, however since the male element and the female element are interchangeable, isolation hanger 108 comprises female element 202B and drive dividers 306,307 may include male element 202A without inhibiting function or performance.

As illustrated in FIG. 2, the design of the male element and the female element of isolation hanger 108 may vary depending upon the application. For example, FIG. 2 illustrates male element 202A designed to hold carrier assembly 102 in position against the force of gravity by resting on female element 202B. One possible example of isolation hanger 108 is illustrated in FIG. 2A, male element 202A features a slightly triangular shape and female element 202B of drive divider 306 is basically and inverse of the shape of male element 202A. In another example illustrated in FIG. 2, isolation hanger 108 features a cylindrical shaped male element 204A and drive dividers 306,307 feature a semi-circular notch female element 202B. In a third example illustrated in FIG. 2, isolation hanger 108 features a rectangular male element 206A and drive dividers 306,307 feature a rectangular female element 206B. In a forth example illustrated in FIG. 2, isolation hanger 108 features a circular through-hole female element 208B and drive dividers 306,307 feature a cone-shaped male element 208A. In a fifth example illustrated in FIG. 2, isolation hanger 108 features a rectangular through-hole female element 210B and drive dividers 306,307 feature male element 210A. In a sixth example illustrated in FIG. 2, isolation hanger 108 features a circular blind-hole female element 212B and drive dividers 306,307 features a cylindrical shaped male element 212A. In a seventh example illustrated in FIG. 2, isolation hanger 108 features a rectangular female element 214B and drive dividers 306,307 comprise a rectangular male element 214A. As previously mentioned, it should be appreciated by one skilled in the art that the male elements and the female elements may be used interchangeably with either isolation hanger 108 or drive dividers 306,307.

FIG. 2 illustrates various male element 202A and female element 202B geometries. Some male element 202A and female element 202B geometries may dampen certain vibrational frequencies better than others. In some examples, male element 202A and female element 202B are shaped to allow hard disk drive 106 to move freely in a linear direction, against the force of gravity. In other examples, male element 202A and female element 202B are shaped to guide the hard disk drive to couple with electrical connector 606 illustrated in FIG. 6. In yet other examples, male element 202A and female element 202B are shaped to prevent hard disk drive 106 from rotating.

Figure 3:
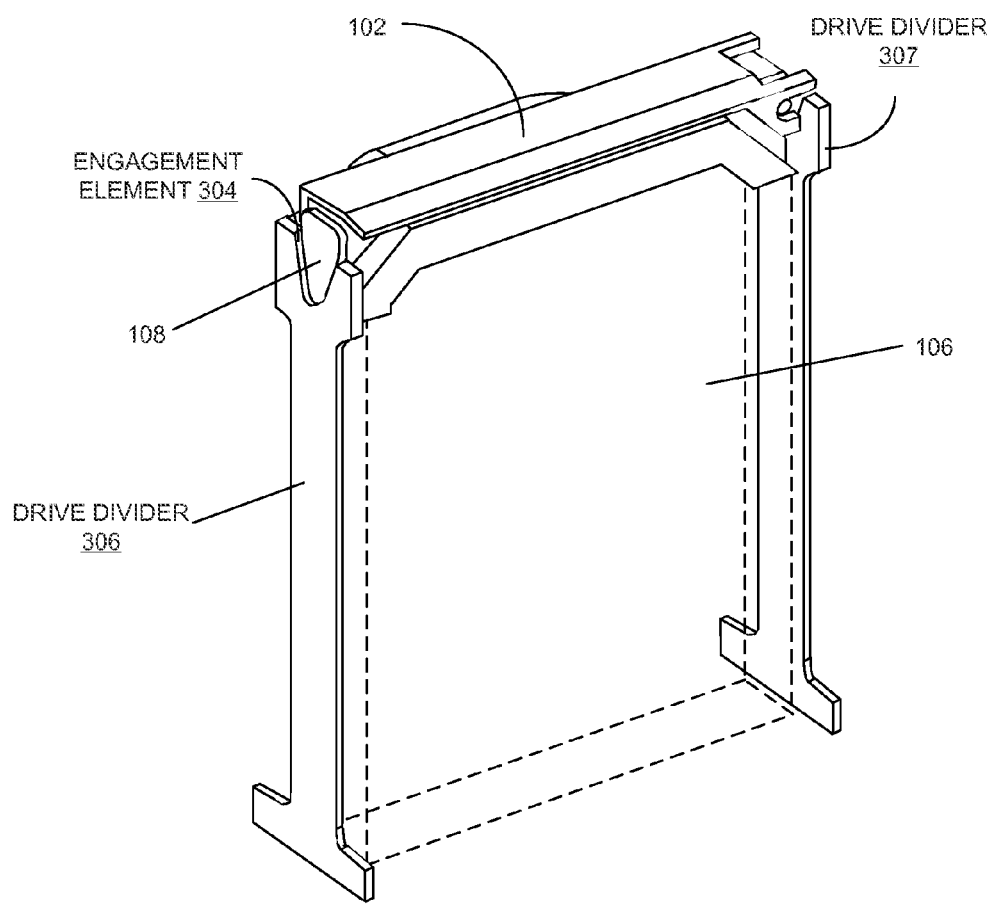
FIG. 3 illustrates a carrier assembly and two drive dividers.

FIG. 3 illustrates how carrier assembly 102, isolation hanger 108, and drive dividers 306,307 work together to hang hard disk drive 106 in a vertical orientation against the force of gravity. It should be noted that in this example, engagement element 304 does not prevent carrier assembly 102 coupled to hard disk drive 106 from moving in up and down in the vertical direction against gravity, thereby helping to isolate vibration. In some examples, drive dividers 306, 307 feature one or more engagement elements 304 configured to mate with isolation hanger 108. In some examples, drive dividers 306,307 have more than one engagement element 304 providing the capability for drive dividers 306,307 to hold more than one carrier assembly 102 and hard disk drive 106.

Some materials suitable for fabricating drive dividers 306, 307 comprise metalloids, metals, alloys, plastics, polymers or ceramics and other materials—including combinations thereof. Metals that are good for vibration reduction comprise shape-memory alloys and ferromagnetic alloys. In some examples, drive dividers 306,307 may be made from materials suitable for injection molding. Thermoplastic materials suitable for injection molding comprise acrylonitrile-butadiene-atyrene, acrylic, nylon, polycarbonate, polypropylene, polybenzimidazole, polyethylene, polystyrene, polyvinyl chloride, or other thermoplastics—including combinations thereof. Thermosetting polymers suitable for injection molding comprise polyurethane, phenol-formaldehyde resin, polyimides, polyester resins and other thermosetting polymers—including combinations thereof. As another example, drive dividers 306,307 may be made by machining operations. Materials suitable for machining operations comprise acetal copolymer, Delrin®, nylon, polycarbonate, polysuflone, Ultem®, aluminum, alloys, steel and other materials—including combinations thereof. In other examples, drive dividers 306,307 may be made by stamping operations. Materials suitable for stamping operations comprise steel, aluminum and various alloys—including combinations thereof.

Figure 4:
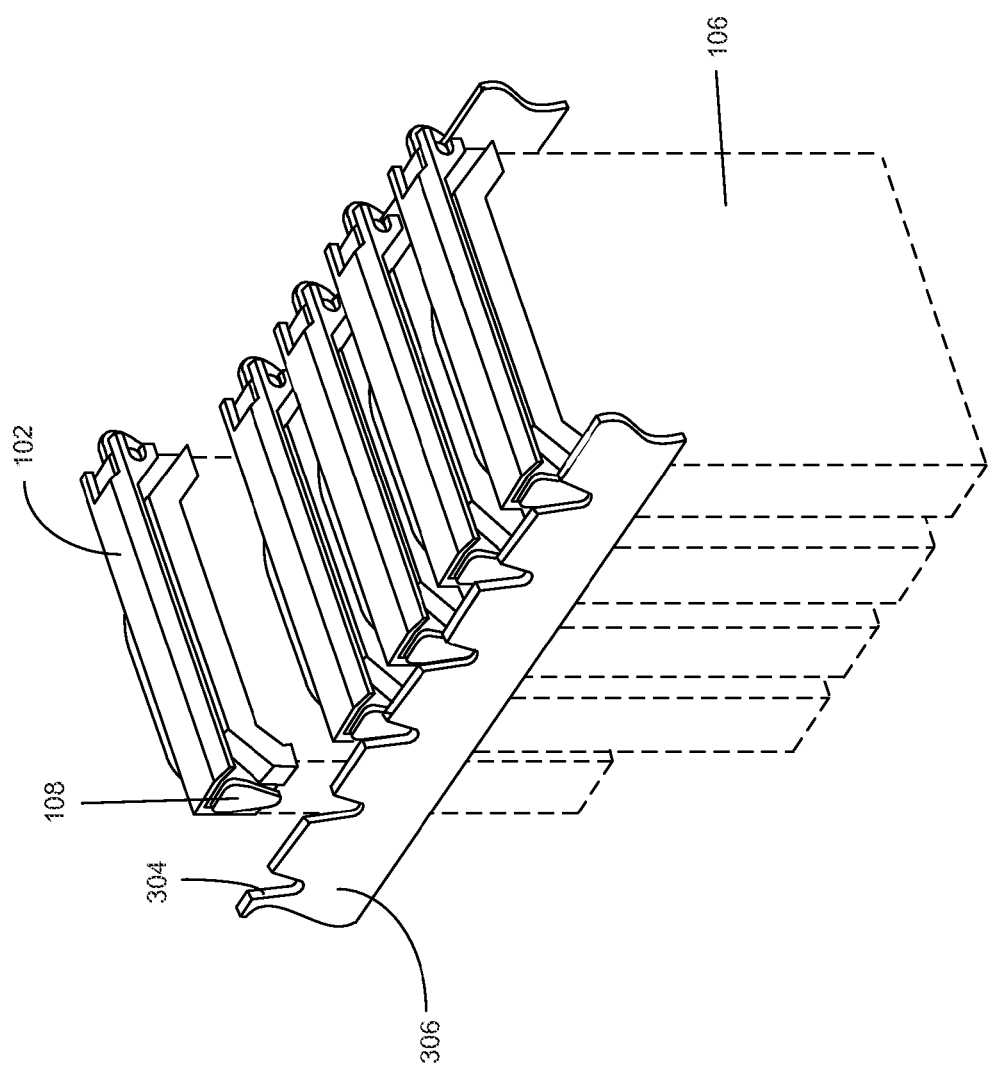
FIG. 4 illustrates a drive divider configured to hold multiple carrier assemblies.

FIG. 4 illustrates another exemplary configuration for drive dividers 306,307. Drive dividers 306,307 comprise multiple engagement elements 304 enabling drive dividers 306,307 to support a plurality of carrier assemblies 102 and hard disk drives 106. In one example, drive dividers 306,307 are integral to the wall of a sled. In another example, drive dividers 306,307 are contained within a rackmount enclosure without the need for a sled. In yet another example, drive dividers 306,307 may be configured to hang carrier assembly 102 and hard disk drive 106 in a room without a sled or a rackmount enclosure. Drive dividers 306,307 and carrier assembly 102 may be used independently of any other structure or technology to hold a large array of independent hard disk drives 106. Drive dividers 306,307 may be very large and capable of holding hundreds of hard disk drives 106.

Figure 5:
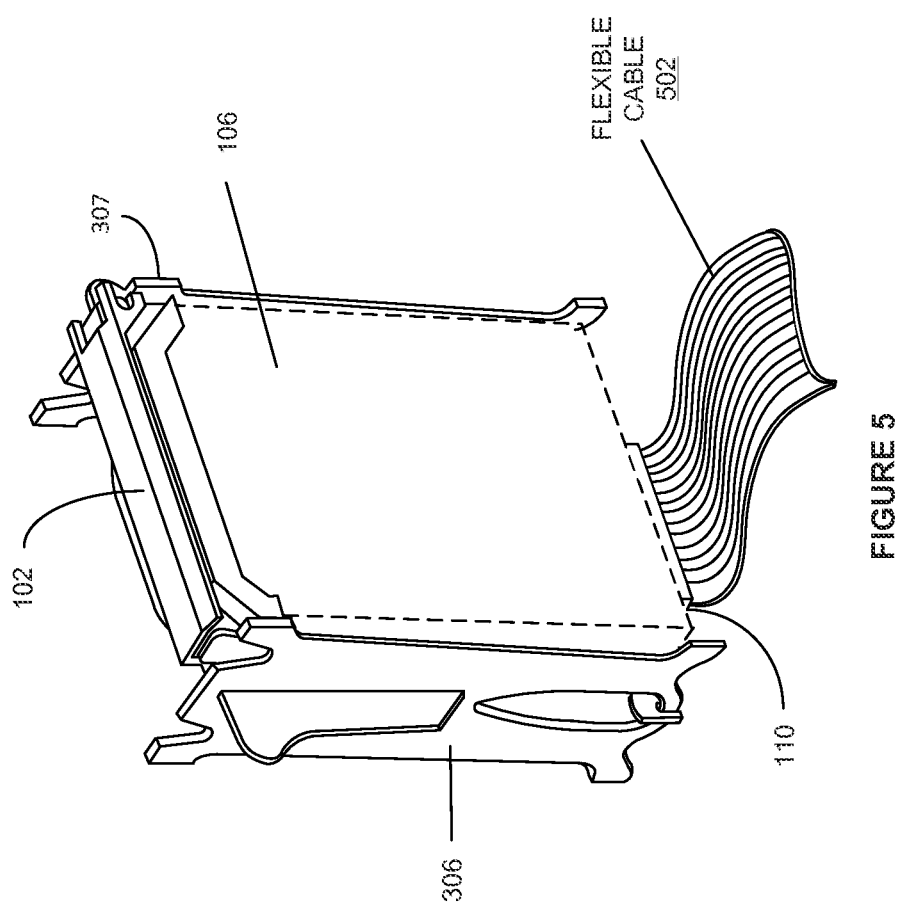
FIG. 5 illustrates hard disk drive carrier, drive dividers and a flexible cable.

FIG. 5 illustrates carrier assembly 102, hard disk drive 106, engagement element 304 and drive dividers 306,307 configured to couple hard disk drive 106 with flexible cable 502. FIG. 5 further illustrates by way of example how drive dividers 306,307 and carrier assembly 102 may be designed to hold hard disk drive 106 in a position convenient to couple electrical connector 110 to flexible cable 502. Vibration transmission between multiple hard disk drives 106 is prevented by a combination of isolation hangers 108 and flexible cable 502. Flexible cable 502 is flexible enough to prevent the transfer of vibration to and from nearby hard disk drives 106.

Figure 6:
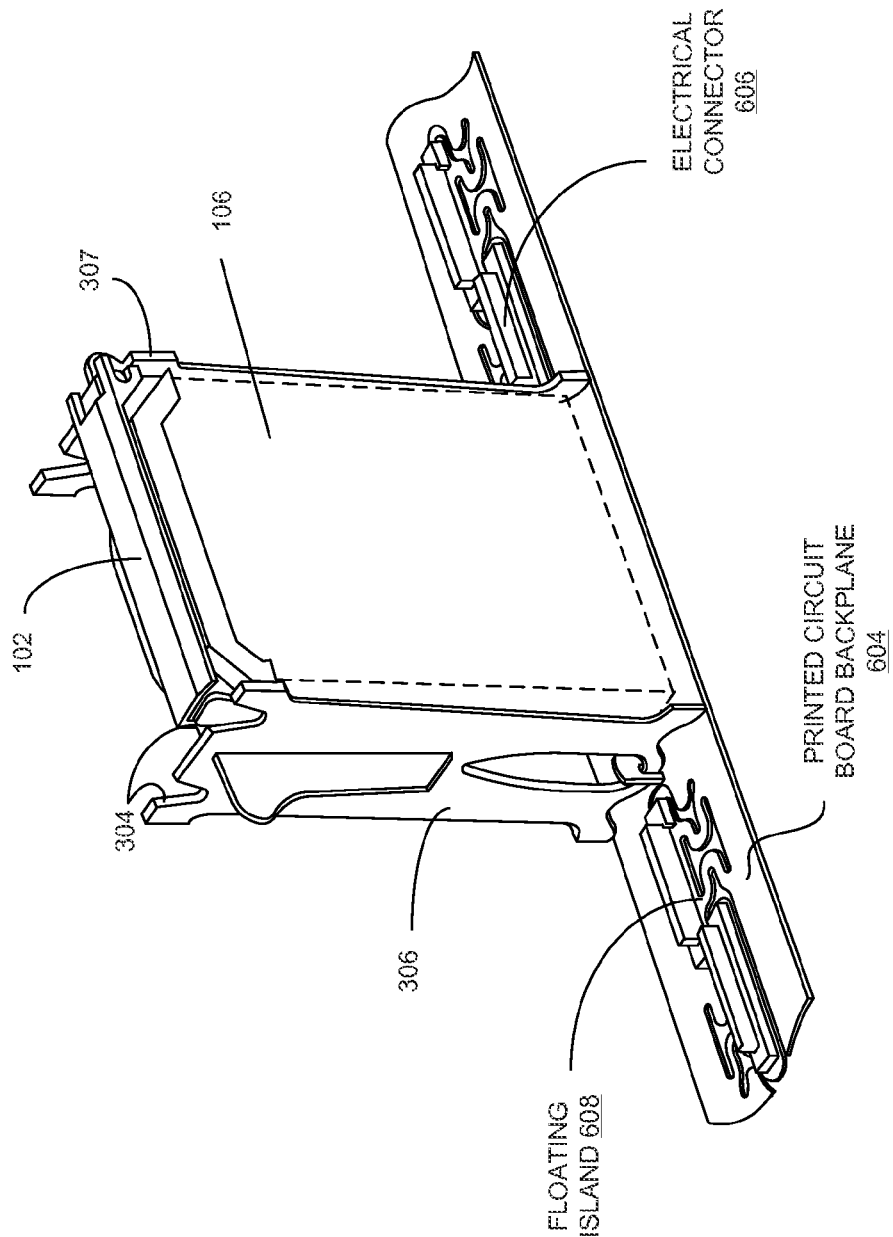
FIG. 6 illustrates a hard disk drive carrier, drive dividers and a flex circuit.

FIG. 6 illustrates an example of carrier assembly 102, hard disk drive 106, engagement element 304, and drive dividers 306, 307 configured to couple hard disk drive 106 to printed circuit board backplane 604. In the example provided in FIG. 6, printed circuit board backplane 604 has a unique design that mounts electrical connectors 606 on a flex-circuit. A flex-circuit comprises floating islands 608 created by selectively removing material from printed circuit board backplane 604. In this example, floating islands 608 integral to printed circuit board backplane 604 flex thereby preventing hard disk drive 106 from transmitting vibration through electrical connector 606 to printed circuit board backplane 604. Alternatively, floating island 608 prevents vibration transmission from printed circuit board backplane 604 through electrical connector 606 to hard disk drive 106.

FIG. 6 further illustrates how certain examples of drive dividers 306, 307 may interface with more than one carrier assembly 102 and printed circuit board backplane 604 comprise multiple electrical connectors 606 to connect multiple hard disk drives 106. Carrier assembly 102, isolation hanger 108, and drive dividers 306,307 may be configured to position hard disk drive 106 in relation to printed circuit board backplane 604 such that hard disk drive 106 can mechanically couple to electrical connector 606. Printed circuit board backplane 604 may comprise a plurality of electrical connectors 606, a plurality of drive dividers 306,307 and a plurality of carrier assemblies 102 to mount an array of independent hard disk drives 106.

The example in FIG. 6 illustrates carrier assembly 102 and hard disk drive 106 having only three points of contact. Carrier body 104 contacts two different points. One point of contact to first drive divider 306 and a second point of contact to second drive divider 307. Vibration transmission to these contact points is mitigated by isolation hangers 108. Hard disk drive 106 makes the third point of contact to floating island. Vibration transmission through the printed circuit board backplane 604 is isolated by the unique design of floating islands 608.

FIGS. 7A, 7B, and 7C each illustrate, by way of example, how hard disk drive 106 and carrier assembly 102 are installed onto printed circuit board backplane 604. FIG. 7A illustrates the initial insertion of carrier assembly 102 and hard disk drive 106 between two drive dividers 306, 307. In this example, electrical connector 606 is mounted to floating island 608 on printed circuit board backplane 604. FIG. 7B further illustrates the insertion process of carrier assembly 102 and hard disk drive 106. FIG. 7C illustrates hard disk drive 106 installed to printed circuit board backplane 604 and electrically coupled to electrical connector 606.

Figure 8:
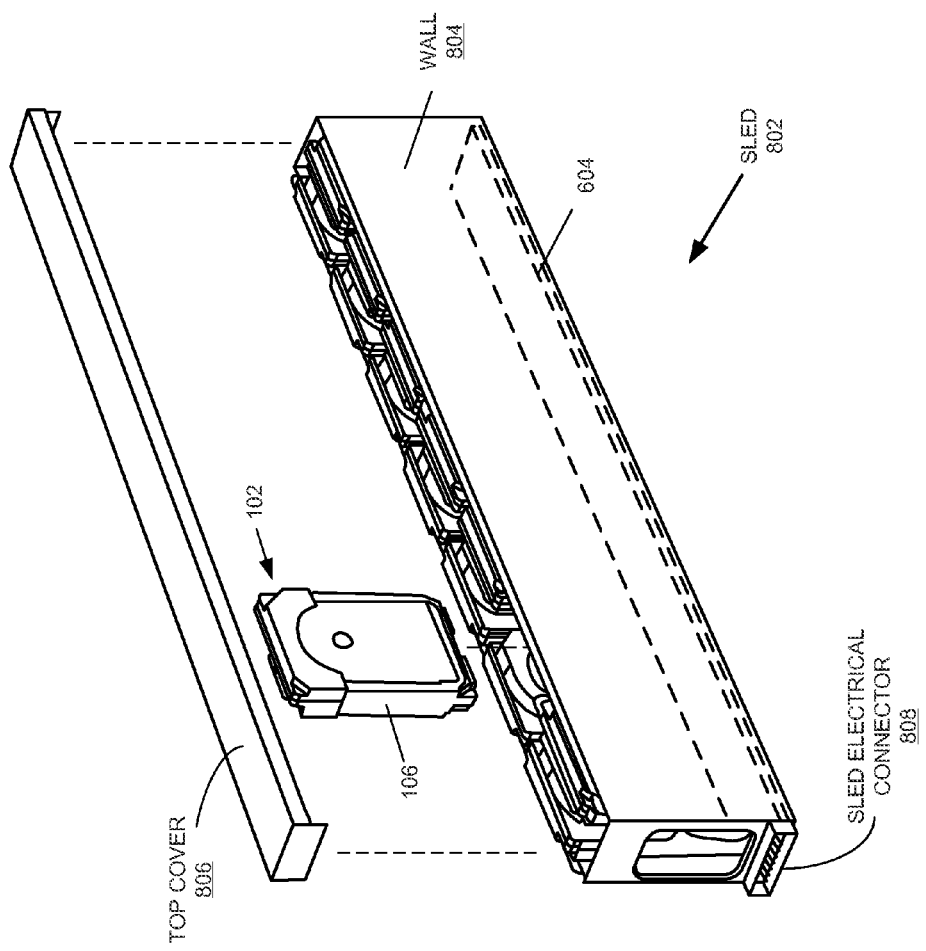
FIGS. 8-9 illustrate sleds containing multiple carrier assemblies and hard disk drives.

FIG. 8 illustrates an example of sled 802 comprising printed circuit board backplane 604, wall 804, top cover 806, sled electrical connector 808, carrier assembly 102, hard disk drive 106 and a plurality of hard disk drives. Sled 802 is a modular unit that holds and operates an array of independent hard disk drives 106. Sled 802 holds a plurality of hard disk drives 106 in close proximity, so that many hard disk drives 106 can be fit into a defined volume. Sled electrical connector 808 electrically couples multiple hard disk drives 106 via printed circuit board backplane 604 a rackmount enclosure. Sled 802 comprises fans or other cooling devices. Multiple sled enclosures 802 may be installed in rackmount enclosures or other support structures. In some examples, as illustrated in FIG. 8, hard disk drives 106 may be mounted parallel to wall 804 of sled 802.

Figure 9:
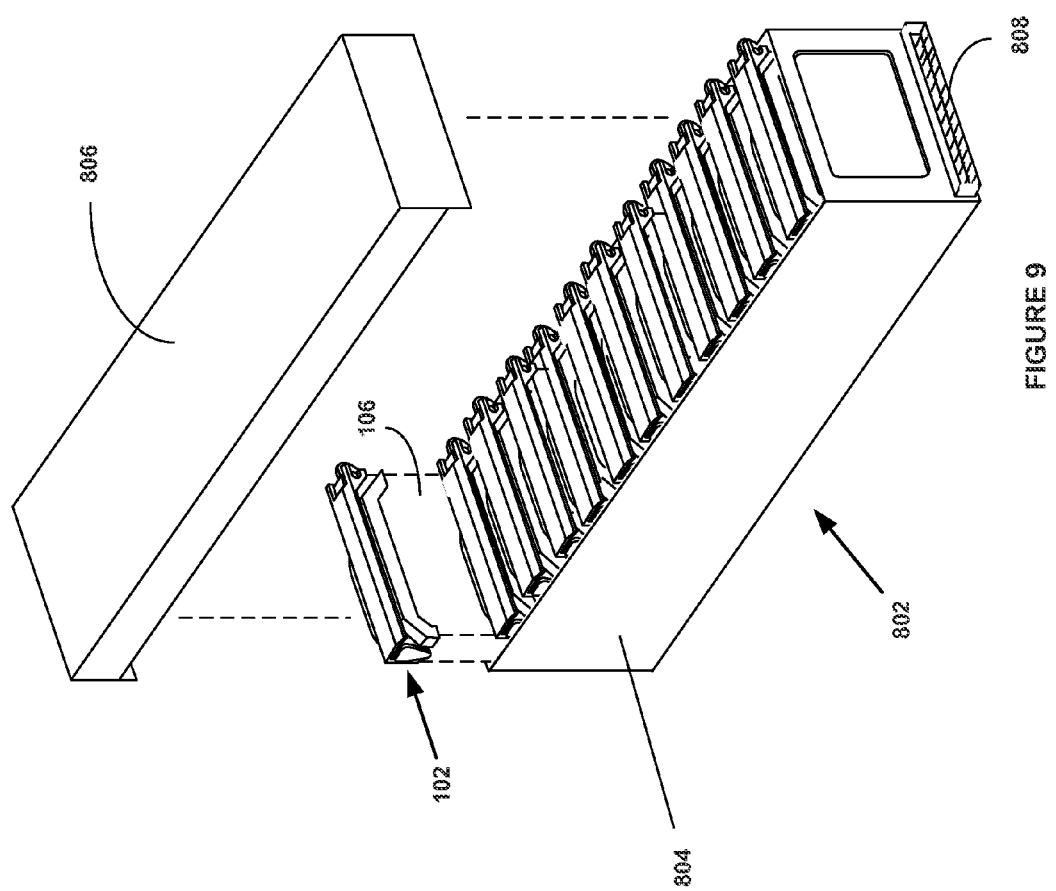

FIG. 9 illustrates an alternate example of sled 802 comprising wall 804, top cover 806, sled electrical connector, carrier assembly 102 and a plurality of hard disk drives 106. In this example, hard disk drives 106 are mounted perpendicular to wall 804 of sled 802. This example is particularly suitable for the example of drive divider 206 illustrated in FIG. 4. In one example, drive dividers 306,307 can be integral to wall 804 of sled 802. In another example, drive dividers 306,307 can be independent of wall 804. Sled 802 has sled electrical connector 808 capable of connecting sled to external devices such as rackmount enclosures.

Figure 10:
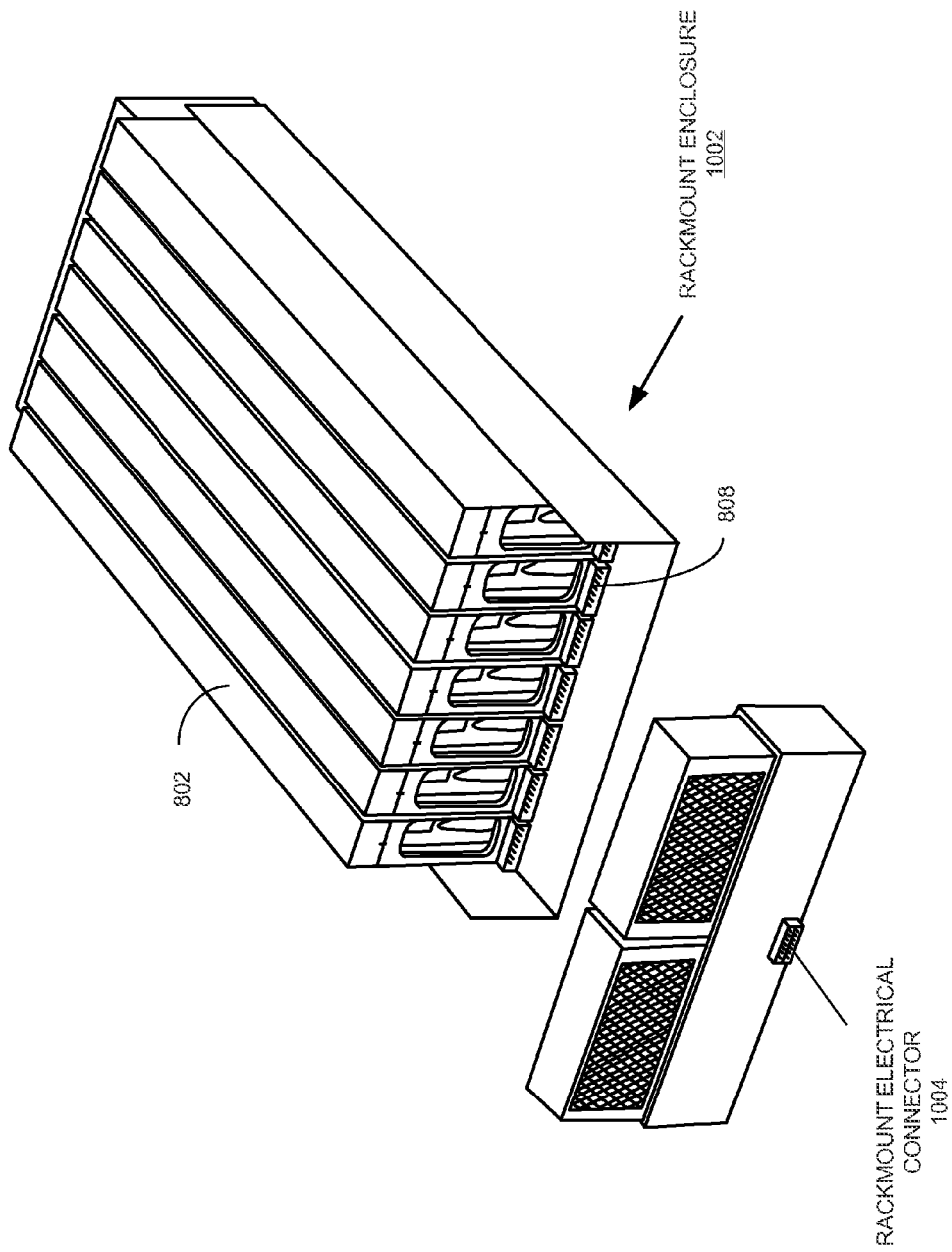
FIG. 10 illustrates a rackmount enclosure.

FIG. 10 illustrates one example of rackmount enclosure 1002 comprising sleds 802, sled electrical connectors 808, rackmount electrical connector 1004 and a plurality of hard disk drives. Rackmount enclosure 1002 may electrically couple to a plurality of sleds 802 via sled electrical connectors 808. Sleds 802 may be quickly and easily installed to (or removed from) rackmount enclosure 1002. Rackmount enclosure 1002 may electrically couple to other devices via rackmount electrical connector 1004. In another example, rackmount enclosure 1002 comprises drive dividers 306,307 carrier assembly 102 and hard disk drive 106 without sleds 802. In one example, rackmount enclosure 1002 holds ninety-eight hard disk drives 106, although a different number is possible. Rackmount enclosure 1002 may contain additional items, including but not limited to electronics, power supply systems and cooling systems.

In most examples, carrier assemblies 102, drive dividers 306,307 and hard disk drives 106 will used by the hundreds or thousands. The more hard disk drives 106 that are operating in close proximity to one another, the more vibration is generated and potentially transferred. In many examples, carrier assemblies 102, drive dividers 306,307 and hard disk drives are contained in a sled 802. In other examples, rackmount enclosure 1002 contains multiple sleds 802 containing multiple carrier assemblies 102, drive dividers 306,307, and hard disk drives 106. Other examples comprise hundreds or thousands of carrier assemblies 102, drive dividers 306,307 and hard disk drives 106 may be contained in rackmount enclosure 1002 that does not include sleds 802.

While the examples provided herein have been particularly shown and described with reference to the preferred implementations, it will be understood by those skilled in the art that various changes in form and detail can be made without departing from the spirit and scope of the idea. For example, the main idea is for each hard disk drive 106 to float within an enclosure. This is accomplished by attaching hard disk drive 106 electrical connectors 110 to floating island 608 in printed circuit board backplane 604. Hard disk drive 106 is enclosed by carrier assembly 102 that hangs from drive dividers 306, 307. Hard disk drive 106 will have linear and rotational vibration that will be damped by floating island 608 and isolation hanger 108 integral to carrier assembly 102. Within carrier assembly 102, there are several features that dampen vibration. First, carrier assembly 102 closes over hard disk drive 106 in a clam-shell fashion. Carrier assembly 102 attaches or grabs onto various recesses or mounts on hard disk drive 106. There are no mechanical fasteners to secure hard disk drive 106—just the wrap around function of the clam-shell type carrier assembly 102. Carrier assembly 102 comprises two isolation hangers 108 from which to hang carrier assembly 102 from the drive dividers 306,307. Carrier assembly 102 meets with drive dividers 306,307 at isolation hangers 108 such that linear and rotational vibration can be absorbed by isolation hangers 108. Accordingly, the examples provided herein are to be considered merely as illustrative and limited in scope only as specified in the appended claims.

What is claimed is:

1. A vibration isolating hard disk drive carrier, comprising:
    a carrier body having a first surface configured to couple to inherent features of a first external surface of a hard disk drive;
    the carrier body having a second surface configured to couple to inherent features of a second external surface hard disk drive;
    one or more isolation hangers configured to support the hard disk drive in a vertical orientation coupled to the carrier body; and
    wherein the only contact points with the carrier body and hard disk drive comprise a first isolation hanger in contact with a first drive divider, a second isolation hanger in contact with a second drive divider, and an electric connector of the hard disk drive in contact with a floating island of a printed circuit board backplane.

2. The carrier body of claim 1 wherein the first surface and the second surface are attached by a hinge that opens and closes in a clamshell fashion encapsulating the hard disk drive.

3. The carrier body of claim 1 wherein the first surface and the second surface comprise mechanical snap locking features to couple to the hard disk drive.

4. The carrier body of claim 1 further comprising mechanical fasteners to couple to the hard disk drive.

5. The isolation hanger claim 1 wherein the isolation hanger is configured to mate with an engagement element in a drive divider.

6. The isolation hanger claim 1 wherein the isolation hanger is fabricated from vibration reducing material.

7. A vibration isolation mounting system for a vibration isolating hard disk drive carrier comprising:
    a carrier body having a first surface configured to couple to inherent features of a first external surface of a hard disk drive;
    the carrier body having a second surface configured to couple to inherent features of a second external surface hard disk drive; and
    one or more isolation hangers configured to support the hard disk drive in a vertical orientation coupled to the carrier body;
    one or more drive dividers comprising one or more engagement elements configured to couple with the one or more isolation hangers of the carrier; and
    wherein the only contact points with the carrier body and hard disk drive comprise a first isolation hanger in contact with a first drive divider, a second isolation hanger in contact with a second drive divider, and an electric connector of the hard disk drive in contact with a flexible cable.

8. The carrier body of claim 7 wherein the first surface and the second surface are attached by a hinge that opens and closes in a clamshell fashion encapsulating the hard disk drive.

9. The carrier body of claim 7 wherein the first surface and the second surface comprise mechanical snap locking features to couple to the hard disk drive.

10. The hanging mounting system of claim 7 wherein the drive divider is configured such that a hard disk drive can mechanically connect to electrical connectors on a printed circuit board backplane.

11. The hanging mounting system of claim 7 further configured to fit within a sled.

12. The hanging mounting system of claim 7 further configured to fit within a rackmount enclosure.

13. A rackmount enclosure comprising:
    a plurality of vibration isolating hard disk drive carriers, each comprising:
        a carrier body having a first surface configured to couple to inherent features of a first external surface of a hard disk drive;
        the carrier body having a second surface configured to couple to inherent features of a second external surface hard disk drive; and
        one or more isolation hangers configured to support the hard disk drive in a vertical orientation coupled to the carrier body;
    one or more drive dividers comprising one or more engagement elements configured to couple with the one or more isolation hanger of the carrier in a vertical support direction; and
    wherein the carrier body does not include means to prevent movement of the carrier body away from engagement with the one or more drive dividers in the vertical support direction.

14. The rackmount enclosure of claim 13 comprising one or more sleds comprising the plurality of vibration isolating hard disk drive carriers.

15. The rackmount enclosure of claim 13 configured to fit within a server rack.

16. The rackmount enclosure of claim 13 configured to hold ninety-eight hard disk drives.

17. A vibration isolating hard disk drive carrier, comprising:
    a carrier body having a first surface configured to couple to inherent features of a first external surface of a hard disk drive;
    the carrier body having a second surface configured to couple to inherent features of a second external surface hard disk drive;
    one or more isolation hangers configured to support the hard disk drive in a vertical orientation coupled to the carrier body; and
    wherein the only contact points with the carrier body and hard disk drive comprise a first isolation hanger in contact with a first drive divider, a second isolation hanger in contact with a second drive divider, and an electric connector of the hard disk drive in contact with a flexible cable.

18. A vibration isolation mounting system for a vibration isolating hard disk drive carrier comprising:
    a carrier body having a first surface configured to couple to inherent features of a first external surface of a hard disk drive;
    the carrier body having a second surface configured to couple to inherent features of a second external surface hard disk drive; and
    one or more isolation hangers configured to support the hard disk drive in a vertical orientation coupled to the carrier body;
    one or more drive dividers comprising one or more engagement elements configured to couple with the one or more isolation hangers of the carrier; and
    wherein the only contact points with the carrier body and hard disk drive comprise a first isolation hanger in contact with a first drive divider, a second isolation hanger in contact with a second drive divider, and an electric connector of the hard disk drive in contact with a floating island of a printed circuit board backplane.

* * * * *